(12) United States Patent
Pfaeffle et al.

(10) Patent No.: US 7,665,295 B2
(45) Date of Patent: Feb. 23, 2010

(54) METHOD FOR OPERATING AN INTERNAL COMBUSTION ENGINE AND DEVICE FOR IMPLEMENTING THE METHOD

(75) Inventors: Andreas Pfaeffle, Wuestenrot (DE); Johannes Schaller, Vaihingen An Der Enz (DE); Wolfram Veigel, Hessigheim (DE); Cord Scharsack, Weil Im Schönbuch (DE); Rudi Drefs, Friolzheim (DE); Viktor Pauli, Stuttgart (DE); Thomas Eh Walter, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 809 days.

(21) Appl. No.: 11/330,414

(22) Filed: Jan. 10, 2006

(65) Prior Publication Data

US 2006/0168941 A1 Aug. 3, 2006

(30) Foreign Application Priority Data

Jan. 10, 2005 (DE) ....................... 10 2005 001 119

(51) Int. Cl.
*F01N 3/00* (2006.01)
(52) U.S. Cl. .............................. 60/286; 60/274; 60/277; 60/295; 60/324
(58) Field of Classification Search .................. 60/274, 60/277, 286, 295, 303, 324
See application file for complete search history.

(56) References Cited

U.S. PATENT DOCUMENTS

| | | | | | |
|---|---|---|---|---|---|
| 5,605,042 | A | * | 2/1997 | Stutzenberger | 60/286 |
| 5,852,929 | A | * | 12/1998 | Kato et al. | 60/274 |
| 5,964,089 | A | * | 10/1999 | Murphy et al. | 60/286 |
| 6,470,673 | B1 | * | 10/2002 | van Nieuwstadt et al. | 60/274 |
| 6,918,245 | B2 | * | 7/2005 | Hirooka et al. | 60/289 |
| 2007/0240405 | A1 | * | 10/2007 | Nishina et al. | 60/286 |
| 2008/0245058 | A1 | * | 10/2008 | Boddy et al. | 60/286 |

FOREIGN PATENT DOCUMENTS

| | | |
|---|---|---|
| DE | 101 59 849 | 6/2003 |
| DE | 10 2004 018 221 | 11/2005 |

* cited by examiner

*Primary Examiner*—Tu M Nguyen
(74) *Attorney, Agent, or Firm*—Kenyon & Kenyon LLP

(57) ABSTRACT

A method is provided for operating an internal combustion engine in whose exhaust-gas region an exhaust-gas treatment device is situated, and in which a reagent is introduced into the exhaust-gas region of the internal combustion engine. in addition, a device is provided for implementing the method. The reagent pressure occurring between a reagent safety valve and a reagent dosing valve, disposed directly in the exhaust-gas region is recorded during different states of the reagent safety valve and/or the reagent dosing valve and compared to at least one threshold value. If the threshold is exceeded, a fault signal is provided. This may offer high safety which may be of particular importance when fuel is used as reagent.

13 Claims, 2 Drawing Sheets

METHOD FOR OPERATING AN INTERNAL COMBUSTION ENGINE AND DEVICE FOR IMPLEMENTING THE METHOD

FIELD OF THE INVENTION

The present invention relates to a method and a device for operating an internal combustion engine in whose exhaust region an exhaust-treatment device is disposed and in which a reagent is introduced into the exhaust region upstream from the exhaust-treatment device.

BACKGROUND INFORMATION

In German Patent Application No. DE 10 2004 018 221 A1, a method and a device are described in which a pressurized reagent is sprayed into the exhaust gas of an internal combustion engine in front of an SCR catalyst. The reagent pressure is specified to a predefined reagent setpoint pressure as a function of a characteristic quantity. A performance quantity of the internal combustion engine and/or a characteristic quantity of the exhaust gas of the internal combustion engine can be utilized as characteristic quantity. The predefined reagent setpoint pressure is regulated within the framework of a closed-loop control in which the actual reagent pressure is detected by a reagent pressure sensor. It is possible to admix pressurized air to the reagent. The compressed air pressure may also be regulated within the framework of a closed-loop control, to a predefined setpoint compressed air pressure as a function of a characteristic quantity, the actual compressed air pressure being detected by a compressed air pressure sensor. A defect of at least one of the pressure sensors may cause reduced performance of the SCR catalyst with the result that non-purified exhaust gas may reach the environment.

In German Patent Application No. DE 10 2004 044 506 A1, a method and a device are described in which a pressurized reagent is sprayed into the exhaust gas of an internal combustion engine in front of an SCR catalyst. The compressed air is guided via a non-return valve having an opening pressure. Provision is made for a diagnosis of the compressed air pressure, which begins at a starting instant with the closing of a compressed air regulation valve. At least at a second point in time it is checked whether the compressed air pressure corresponds to at least one lower threshold value, which at least approximately corresponds to the opening pressure, added to the ambient air pressure, of the non-return valve. A fault signal will be supplied if the condition is not satisfied.

In German Patent Application No. DE 101 59 849 A1, another method and device are described in which a pressurized reagent is sprayed into the exhaust gas of an internal combustion engine in front of an SCR catalyst. Fuel is provided as reagent, which acts as reducing agent for the NO2 portion in the exhaust gas, in particular.

SUMMARY

In accordance with example embodiments of the present invention, a method and device are provided for operating an exhaust-gas treatment device of an internal combustion engine in whose exhaust-gas region an exhaust-gas treatment device is disposed and in which a reagent is introduced into the exhaust-gas region upstream in front of the exhaust-gas treatment device.

An example method of the present invention for operating an internal combustion engine in whose exhaust-gas region an exhaust-gas treatment device is located provides for a reagent to be introduced into the exhaust-gas region upstream in front of the exhaust-gas treatment device. The reagent is brought to a predefined reagent source pressure. Disposed in the flow direction of the reagent is, first of all, a switchable reagent safety valve and then a continuous reagent dosing valve. The reagent dosing valve is situated in the exhaust-gas region and sprays the reagent immediately and directly into the exhaust-gas region. The reagent pressure is detected in the reagent path, which is situated between the reagent safety valve and the reagent dosing valve. The reagent pressure detected in at least one predefined state of the reagent safety valve and/or the reagent dosing valve is compared to at least one threshold value. A fault signal will be provided if the threshold is exceeded.

Due to the diagnosis of the reagent pressure the procedure according to the present invention considerably increases the safety during operation of the internal combustion engine, in particular if the reagent, such as fuel, is highly flammable. The procedure according to the present invention allows the detection of a leak in the reagent path. Furthermore, it is possible to check the valves disposed in the reagent path, which may jam in case of a fault.

According to one refinement, it is ascertained whether the reagent pressure corresponds at least to the exhaust-gas pressure when the reagent safety valve and the reagent dosing valve are closed. This makes it possible to detect a leak in the reagent path. In another refinement, it is checked whether the reagent pressure is below the reagent source pressure, minus the pressure difference at the reagent safety valve, given a closed reagent safety valve and a closed reagent dosing valve. Jamming of the reagent safety valve in the at least partially open state is able to be detected in this manner.

In a further refinement of the example embodiment, it is checked whether the reagent pressure corresponds at least approximately to the reagent source pressure following a subsequent opening of the reagent safety valve. This makes it possible to detect jamming of the reagent safety valve in the closed state. Moreover, it can be detected that the reagent dosing valve jams in an at least partially open state.

In a further refinement of the example embodiment, the test will check whether the reagent pressure has at least the exhaust-gas pressure following a subsequent closing of the reagent safety valve and a following opening of the reagent dosing valve. In this way it is possible to determine whether the reagent dosing valve jams in the closed state. In addition, it is possible to detect jamming of the reagent safety valve in the at least partially open state.

According to one refinement, it is checked whether the reagent pressure is just below the reagent source pressure, minus the pressure drop at the reagent safety valve, when the reagent safety valve and the reagent dosing valve are open simultaneously. This measure makes it possible to determine whether either the reagent safety valve or the reagent dosing valve is jamming in the closed state.

In a further refinement of the example embodiment, it is checked whether the reagent pressure is above the exhaust-gas pressure and below the reagent source pressure, minus the pressure drop at the reagent safety valve, following a subsequent closing of the reagent safety valve and a following closing of the reagent dosing valve. Especially when the reagent safety valve is closed already, but the reagent dosing valve is still open, it may be ascertained whether the reagent pressure drop does not exceed a specified pressure gradient or differential quotient. This allows a check as to whether the reagent dosing valve jams in the at least partially open state. In addition, it may be determined whether the reagent path has a leak.

The device for operating an internal combustion engine first of all relates to a control unit, which is configured to execute the method.

In particular, the control unit includes a diagnosis controller, a threshold value selection, and a comparator, which compares the at least one threshold value to the detected reagent pressure.

The control unit preferably includes at least one electrical memory in which the method steps are stored in the form of a computer program.

Additional advantageous refinements and embodiments of the method according to the present invention are described below.

DETAILED DESCRIPTION OF EXAMPLE EMBODIMENTS

Figure 1:
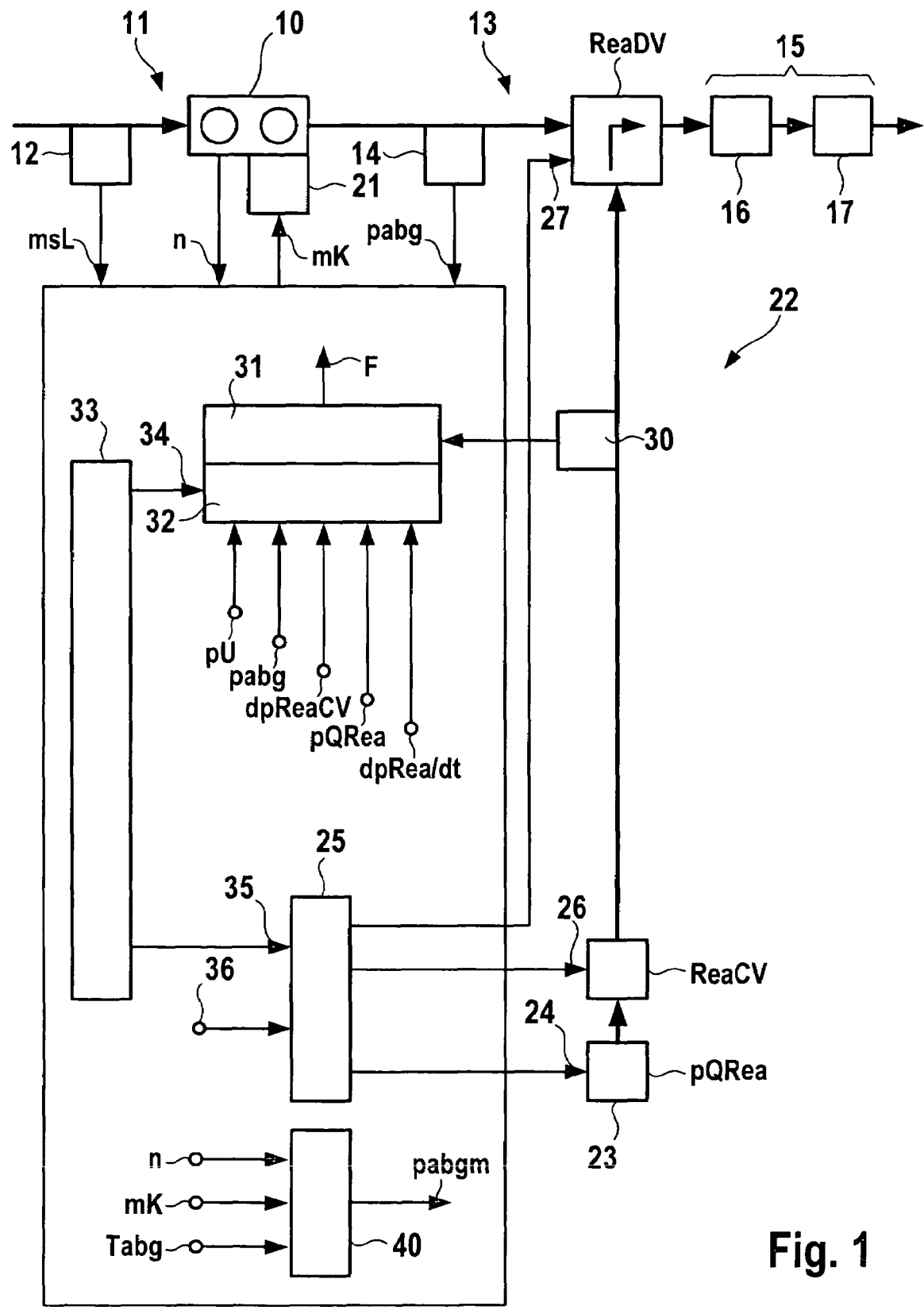
FIG. 1 shows a technical environment in which an example method according to the present invention is running.

FIG. 1 shows an internal combustion engine 10 in whose air-induction region 11 an inducted-air detection 12 is located and in whose exhaust-gas region 13 an exhaust-gas pressure sensor 14, a reagent dosing valve ReaDV, and an exhaust-gas treatment device 15 are positioned. Exhaust-gas treatment device 15 includes a first and a second exhaust-gas treatment device 16, 17, respectively.

Inducted-air detection 12 outputs an air signal msL to a control unit 20; internal combustion engine 10 supplies rotational speed n, and exhaust pressure sensor 14 supplies an exhaust-gas pressure signal pabg.

Control unit 20 sends a fuel signal mK to a fuel-metering device 21.

In a reagent path 22 a reagent pump 23 brings a reagent to a predefined reagent source pressure pQRea. Reagent pump 23 is triggered by a reagent pump trigger signal 24, which is provided by a reagent dosage controller 25 situated in control unit 20.

The reagent arrives at a reagent safety valve ReaCV, which is switched by reagent dosage controller 25 via a reagent safety valve trigger signal 26. The reagent then arrives at reagent dosing valve ReaDV, which is continually activated by reagent dosage controller 25 via a reagent dosing valve trigger signal 27.

Disposed between reagent safety valve ReaCV and reagent dosing valve ReaDV is a reagent pressure sensor 30, which supplies reagent pressure pRea to a comparator 31.

A threshold value selection 32, which is controlled by a diagnosis controller 33 using a threshold value selection signal 34, is assigned to comparator 31. Available as threshold values are ambient air pressure pU, exhaust-gas pressure pabg, opening pressure dpReaCV of reagent safety valve ReaCV, reagent source pressure pQRea, and a pressure gradient dpRea/dt.

Diagnosis controller 33 transmits a diagnosis signal 35 to reagent dosage controller 25. Reagent dosage controller 25 is supplied with a dosing signal 36.

Control unit 20 includes a model 40 for ascertaining a calculated exhaust-gas pressure pabgm as a function of rotational speed n, fuel signal mK, and exhaust temperature Tabg.

Figure 2A:
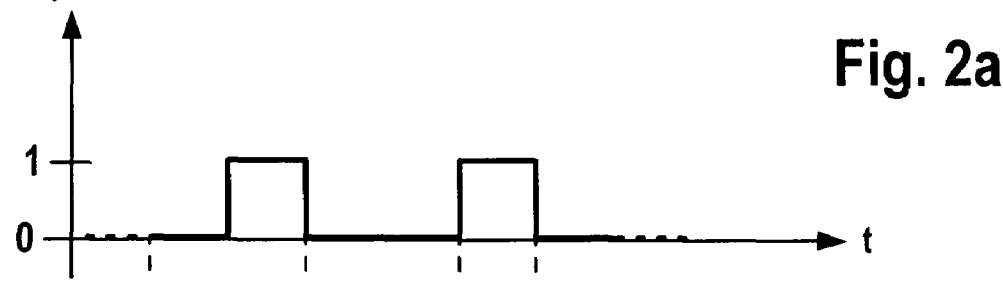
FIGS. 2a-2c show signal curves as a function of time.

FIG. 2a shows reagent safety valve trigger signal 26 as a function of time t. Reagent safety valve ReaCV is closed between a first and second instant t1, t2, respectively, between a third and fifth instant t3, t5, respectively, and following a sixth instant t6. Between second and third instant t2, t3, respectively, and a fifth and sixth instant t5, t6, respectively, reagent safety valve ReaCV is open.

Figure 2B:
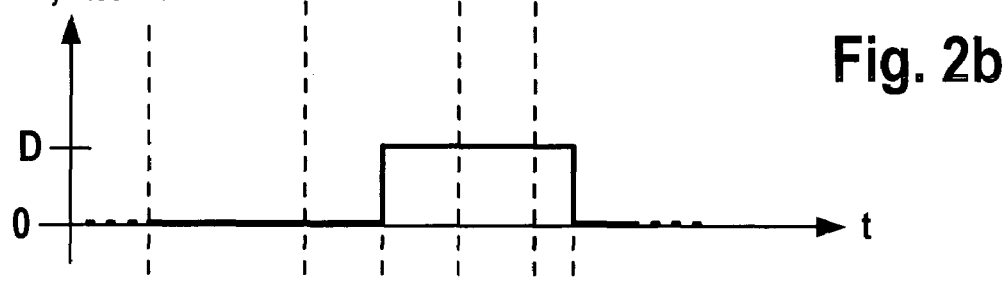

FIG. 2b shows reagent dosing valve trigger signal 27 as a function of time t. Reagent dosing valve ReaDV is closed between first and fourth instant t1, t4, respectively, and following a seventh instant t7. Between fourth and seventh instant t4, t7, respectively, reagent dosing valve ReaDV is open to adjust the predefined flow rate D.

Figure 2C:
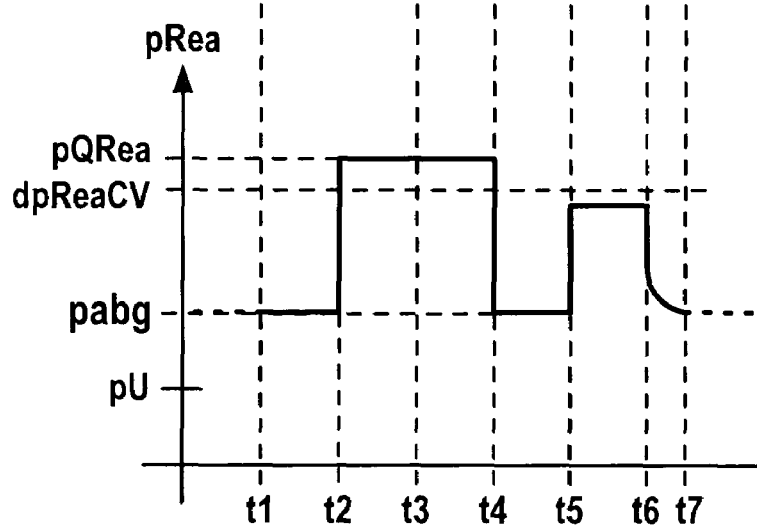

FIG. 2c shows reagent pressure pRea as a function of time t. Plotted are ambient air pressure pU, exhaust-gas pressure pabg, pressure drop dpReaCV at reagent safety valve ReaCV, and reagent source pressure pQRea.

Between first and second instant t1, t2, respectively, reagent pressure pRea amounts at least to exhaust-gas pressure pabg, and is below reagent source pressure pQRea, minus pressure drop dpReaCV at reagent safety valve ReaCV. Between second and fourth instant t2, t4, respectively, reagent source pressure pQRea is present at least approximately. Between fourth and fifth instant t4, t5, respectively, reagent pressure pRea exhibits exhaust-gas pressure pabg as a minimum, and it is below reagent source pressure pQRea, minus pressure drop dpReaCV at reagent safety valve ReaCV. Between fifth and sixth instant t5, t6, respectively, reagent pressure pRea is just below reagent source pressure pQRea, minus pressure drop dpReaCV at reagent safety valve ReaCV. At sixth instant t6, a pressure drop sets in, which ends at seventh instant t7 just above exhaust-gas pressure pabg.

The example method of the present invention operates as follows:

The exhaust gas of internal combustion engine 10 contains undesired components such as nitrogen oxide and soot. Exhaust-gas treatment device 15 is provided to reduce the undesired components as much as possible. First exhaust-gas treatment device 16, which is part of exhaust-gas treatment device 15, is an oxidation catalyst, for example, which oxidizes oxidizable exhaust components to the greatest degree possible. As an alternative or in addition, second exhaust-gas treatment device 17 may be provided, which is also part of exhaust-gas treatment device 15. Second exhaust-gas treatment device 17 is, for instance, a particle filter and/or a catalytic converter, preferably a NOx adsorption catalyst or an SCR catalyst.

Exhaust-gas treatment device 15 may require a minimum temperature that must be exceeded to realize the exhaust-cleaning function. For instance, a reaction on a catalytically acting surface takes place in an optimal manner within a certain temperature window. Furthermore, a minimum temperature may be necessary to be able to implement a regeneration of second exhaust-gas treatment device 17, in particular. For example, to start the particle burn-off, a particle filter requires a starting temperature that may range between 450 and 650° C. A NOx adsorption catalyst requires an increased temperature of up to 800° C. during desulfation.

To increase the temperature of the exhaust gas, the reagent, which may react exothermally on a catalytically acting surface, may be introduced into exhaust-gas region 13. Reagent dosing valve ReaDV may be situated upstream from first exhaust-gas treatment device 16, for instance, which may be embodied as oxidation catalyst. Reagent dosing valve ReaDV is situated directly in exhaust-gas region 13 and sprays the reagent immediately and directly into exhaust-gas region 13. As an alternative, reagent dosing valve ReaDV may be disposed directly in exhaust-gas region 13, downstream from first exhaust-gas treatment device 16, so as to provide the reagent only to second exhaust-gas treatment device 17.

Second exhaust-gas treatment device 17, in particular, may require a reagent to support and/or implement the exhaust-gas purification function. For instance, a NOx adorption catalyst requires low-oxygen exhaust gas to carry out the regeneration.

The reagent is fuel, in particular, so that no separate reagent will have to be taken along in a vehicle. Due to the high flammability of fuel and fuel vapor, in particular, more stringent safety requirements must be met.

The required reagent source pressure pQRea is provided by reagent pump 23. Reagent source pressure pQRea may also be provided by a low-pressure fuel system of an internal combustion engine that includes a fuel pump located in a fuel tank, for instance.

Therefore, reagent path 22 provides reagent safety valve ReaCV, which is either closed or opened completely by reagent safety valve trigger signal 26. Under operating conditions, pressure drop dpReaCV occurs at reagent safety valve ReaCV, which is to be related to reagent source pressure pQRea. The relation is established in threshold value selection 32 prior to the comparison with reagent pressure pRea.

Flow rate D of the reagent may be adjusted with the aid of reagent dosing valve trigger signal 27, using reagent dosing valve ReaDV. A clocked operation in which reagent dosing valve ReaDV is opened and closed in quick time succession, is preferably provided, so that predefined flow rate D comes about on the average over time.

Reagent pressure sensor 30 detects reagent pressure pRea in reagent path 22 between reagent safety valve ReaCV and reagent dosing valve ReaDV. An analysis of reagent pressure pRea with respect to the absolute value and/or the variations, provided by reagent pressure sensor 30, allows a check as to whether there is a leak in reagent path 22. A leak, in particular a leak that occurs in exhaust-gas region 13, may be tied to an increased operating risk, especially when the reagent is a highly flammable substance such as fuel.

Comparator 31 evaluates reagent pressure pRea by comparing it to at least one predefined threshold value, which may be an absolute pressure and/or, for instance, a pressure change and/or a pressure gradient. A selective diagnosis is able to be implemented by triggering reagent dosing valve ReaDV via reagent dosing valve trigger signal 27 and/or by triggering reagent safety valve ReaCV via reagent safety valve trigger signal 26. The diagnosis extends also to the proper functioning of reagent dosing valve ReaDV and/or reagent safety valve ReaCV. Furthermore, it is possible to check reagent source pressure pQRea.

During normal operation of exhaust-gas treatment device 15 the dosing is implemented using dosing signal 36, which is conveyed to reagent dosage controller 25. Normal dosing operation may be interrupted by diagnosis signal 35, which is provided by diagnosis controller 35. Using diagnosis signal 35, it is possible, for instance, to influence reagent pump trigger signal 24 and/or reagent safety valve trigger signal 26.

According to FIGS. 2a-2c, at first instant t1, it is initially assumed that no dosing of the reagent occurs, both reagent safety valve ReaCV and reagent dosing valve ReaDV being closed. Until second instant t2, reagent pressure pRea must at least have exhaust-gas pressure pabg and be below reagent source pressure pQRea, minus pressure drop dpReaCV at reagent safety valve ReaCV.

During operation of internal combustion engine 10, exhaust-gas pressure pabg, which is to be related to ambient air pressure pU, is above ambient air pressure pU which, for instance, is measured by a pressure sensor, for example, which is not shown further. Exhaust-gas pressure pabg may be measured by pressure sensor 14, for example. As an alternative or in addition, for diagnostic purposes, for instance, exhaust-gas pressure pabg may be calculated by model 40. Calculated exhaust-gas pressure pabgm may be determined in a simple approximation from rotational speed n and fuel signal mK. If indicated, exhaust-gas temperature Tabg will be taken into account. Exhaust-gas pressure pabg amounts to maximally 500 mbar, for example. It is predominately defined by the counterpressure of exhaust-gas treatment device 15. If second exhaust-gas treatment device 17 is specifically realized as particle filter, the counterpressure rises with increasing load state.

If reagent pressure pRea corresponds at least approximately to ambient air pressure pU between first and second instant t1, t2, a leak has occurred in reagent path 22. If reagent pressure pRea is not below reagent source pressure pQRea, minus pressure drop dpReaCV at reagent safety valve ReaCV, and instead corresponds at least approximately to, for instance, reagent source pressure pQRea, which is 10 bar, for example, reagent safety valve ReaCV jams at least in the partially open state.

At second instant t2, reagent safety valve ReaCV is opened. Reagent dosing valve ReaDV remains closed. Reagent pressure pRea must then correspond to reagent source pressure pQRea at least approximately. If reagent pressure pRea does not change or if it changes only slightly, reagent safety valve ReaCV jams in the closed state. If reagent pressure pRea is just below reagent source pressure pQRea, minus pressure drop dpReaCV at reagent safety valve ReaCV, reagent dosing valve ReaDV jams at least in the partially open state. Undesired dosing of the reagent would occur in this case.

Starting with third instant t3, reagent safety valve ReaCV is closed. Reagent dosing valve ReaDV remains closed. The reagent, which is now sealed in reagent path 22, must continue to exhibit reagent source pressure pQRea at least approximately. A pressure drop points either to a leak in reagent path 22 or to jamming of reagent dosing valve ReaDV in the at least partially open state.

At fourth instant t4, reagent dosing valve ReaDV will be opened. Reagent safety valve ReaCV remains closed. Starting from of a reagent pressure pRea that corresponds at least approximately to reagent source pressure pQRea, reagent pressure pRea must drop at least approximately to exhaust-gas pressure pabg. If reagent pressure pRea is just below reagent source pressure pQRea, minus pressure drop dpReaCV at reagent safety valve ReaCV, reagent safety valve ReaDC jams in the at least partially open state. Undesired dosing of the reagent would occur. If reagent pressure pRea continues to correspond at least approximately to reagent source pressure pQRea, reagent dosing valve ReaDV jams in the closed state.

At fifth instant t5, both reagent safety valve ReaCV and reagent dosing valve ReaDV are opened simultaneously. Reagent pressure pRea must be just below reagent source pressure pQRea, minus pressure drop dpReaCV at reagent safety valve ReaCV. This state corresponds to normal dosing operation. If reagent pressure pRea drops at least approximately to exhaust-gas pressure pabg, reagent safety valve ReaCV jams in the closed state. If reagent pressure pRea corresponds at least approximately to reagent source pressure pQRea, reagent dosing valve ReaDV jams in the closed state.

At sixth instant t6, reagent safety valve ReaCV will be closed. Either virtually at the same time or no later than at seventh instant t7, reagent dosing valve ReaDV will be closed. A pressure drop must occur following sixth instant t6, which is compared in comparator 31 to predefined pressure gradient dpRea/dt. Pressure gradient dpRea/dt may be approximated as differential quotient, for example. The comparison takes place at a predefined instant or within a predefined time interval inside the time interval that lies between sixth and seventh instant t6, t7, respectively.

The time-staggered closing of reagent dosing valve ReaDV with respect to the closing of reagent safety valve ReaCV at seventh instant t7 is intended to ensure that reagent path 22 will not be closed prematurely at sixth instant t6. Moreover, following seventh instant t7, it may be checked whether reagent pressure pRea has dropped at least approximately to exhaust-gas pressure pabg. If this is not the case, reagent dosing valve ReaDV jams in the closed state. Too rapid a pressure drop points to a leak in reagent path 22.

If comparator 31 detects at least one threshold exceedance, fault signal F will be provided, which may be stored in a fault memory and/or made to be displayed.

A plausibility check of reagent pressure pRea provided by reagent pressure sensor 30 may take place using, for instance, reagent source pressure pQRea, exhaust-gas pressure pabg, and/or ambient air pressure pU.

What is claimed is:

1. A method for operating an internal combustion engine in whose exhaust-gas region an exhaust-gas treatment device is situated, comprising:
   introducing a reagent into the exhaust-gas region upstream in front of the exhaust-treatment device;
   immediately and directly spraying the reagent into the exhaust-gas region, wherein in a flow direction of the reagent, which is brought to a predefined reagent source pressure, a switchable reagent safety valve is arranged first and then a continuous reagent dosing valve, the reagent dosing valve being disposed in the exhaust-gas region;
   recording a reagent pressure in a reagent path, the reagent path being between the reagent safety valve and the reagent dosing valve;
   comparing the reagent pressure detected in at least one predefined state of at least one of the reagent safety valve, and the reagent dosing valve, to at least one threshold value, wherein the comparing step includes:
      a first checking step including checking whether the reagent pressure is just below the reagent source pressure, minus a pressure drop at the reagent safety valve when the reagent safety valve and the reagent dosing valve are open simultaneously; and
      a second checking step including checking whether the reagent pressure is above an exhaust-gas pressure and below the reagent source pressure, minus the pressure drop at the reagent safety valve following a closing of the reagent safety valve subsequent to the first checking step and a closing of the reagent dosing valve subsequent to the first checking step; and
   providing a fault signal in case of a threshold exceedance.

2. The method as recited in claim 1, wherein the comparing step further includes a third step including checking whether the reagent pressure is below the reagent source pressure minus a pressure drop at the reagent safety valve when the reagent safety valve and the reagent dosing valve are closed.

3. The method as recited in claim 1, further comprising:
   checking whether the reagent pressure drop does not exceed a predefined pressure gradient.

4. The method as recited in claim 1, wherein the comparing step further includes a third checking step including checking whether the reagent pressure exhibits at least an exhaust-gas pressure when the reagent safety valve and the reagent dosing valve are closed.

5. The method as recited in claim 4, wherein the comparing step further includes a fourth checking step including checking whether the reagent pressure corresponds at least approximately to the reagent source pressure following an opening of the reagent safety valve subsequent to the third checking step.

6. The method as recited in claim 5, wherein the comparing step further includes a fifth checking step including checking whether the reagent pressure has at least the exhaust-gas pressure following a closing of the reagent safety valve subsequent to the fourth checking step and an opening of the reagent dosing valve subsequent to the closing, subsequent to the fourth checking step, of the reagent safety valve.

7. The method as recited in claim 5, wherein the comparing step further includes a fifth checking step including checking whether the reagent pressure continues to correspond at least approximately to the reagent source pressure following a closing of the reagent safety valve subsequent to the fourth checking step.

8. The method as recited in claim 7, wherein the comparing step further includes a sixth checking step including checking whether the reagent pressure has at least the exhaust-gas pressure following a closing of the reagent safety valve subsequent to the fifth checking step and an opening of the reagent dosing valve subsequent to the closing, subsequent to the fifth checking step, of the reagent safety valve.

9. The method as recited in claim 8, wherein the fourth checking step is performed following the third checking step, the fifth checking step is performed following the fourth checking step, the sixth checking step is performed following the fifth checking step, the first checking step is performed following the sixth checking step, and the second checking step is performed following the first checking step.

10. The method as recited in claim 9, wherein the third checking step further includes checking whether the reagent pressure is below the reagent source pressure minus a pressure drop at the reagent safety valve when the reagent safety valve and the reagent dosing valve are closed.

11. The method as recited in claim 10, further comprising:
    following the second checking step, checking whether the reagent pressure drop does not exceed a predefined pressure gradient.

12. A device for operating an internal combustion engine having an exhaust-gas region, an exhaust-gas treatment device being situated in the exhaust-gas region, the device comprising:
    a control unit configured to control the following steps:
       introducing a reagent into the exhaust-gas region upstream in front of the exhaust-treatment device;
       immediately and directly spraying the reagent into the exhaust-gas region, wherein in a flow direction of the reagent, which is brought to a predefined reagent source pressure, a switchable reagent safety valve is arranged first and then a continuous reagent dosing valve, the reagent dosing valve being disposed in the exhaust-gas region;
       recording a reagent pressure in a reagent path, the reagent path being between the reagent safety valve and the reagent dosing valve;
       comparing the reagent pressure detected in at least one predefined state of at least one of the reagent safety valve, and the reagent dosing valve, to at least one threshold value, wherein the comparing step includes:
          a first checking step including checking whether the reagent pressure is just below the reagent source pressure, minus a pressure drop at the reagent safety valve when the reagent safety valve and the reagent dosing valve are open simultaneously; and a second checking step including checking whether the reagent pressure is above an exhaust-gas pressure and below the reagent source pressure, minus the pressure drop at the reagent safety valve following a closing of the reagent safety valve subsequent to the first checking step and a closing of the reagent dosing valve subsequent to the first checking step; and providing a fault signal in case of a threshold exceedance.

13. The device as recited in claim 12, wherein the control unit includes a diagnostic controller, a threshold value selection and a comparator for comparing the reagent pressure to at least one threshold value.

* * * * *

UNITED STATES PATENT AND TRADEMARK OFFICE
CERTIFICATE OF CORRECTION

PATENT NO. : 7,665,295 B2  Page 1 of 1
APPLICATION NO. : 11/330414
DATED : February 23, 2010
INVENTOR(S) : Pfaeffle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Seventh Day of December, 2010

David J. Kappos
*Director of the United States Patent and Trademark Office*